(12) United States Patent
Gonzalez Aguirre

(10) Patent No.: US 12,275,158 B2
(45) Date of Patent: Apr. 15, 2025

(54) GENERATION OF THREE-DIMENSIONAL REPRESENTATION OF OBJECT SURFACE FROM STRUCTURED POINT-CLOUD

(71) Applicant: Intel Corporation, Santa Clara, CA (US)

(72) Inventor: David Gonzalez Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 17/213,855

(22) Filed: Mar. 26, 2021

(65) Prior Publication Data

US 2021/0213617 A1 Jul. 15, 2021

(51) Int. Cl.
| | |
|---|---|
| B25J 9/16 | (2006.01) |
| B25J 13/08 | (2006.01) |
| B25J 19/02 | (2006.01) |
| G06T 1/00 | (2006.01) |
| G06T 17/10 | (2006.01) |
| G06T 17/20 | (2006.01) |

(52) U.S. Cl.
CPC .......... B25J 9/1697 (2013.01); B25J 9/1687 (2013.01); B25J 13/089 (2013.01); B25J 19/023 (2013.01); G06T 1/0014 (2013.01); G06T 17/10 (2013.01); G06T 17/20 (2013.01)

(58) Field of Classification Search
CPC ....... G06T 1/0014; G06T 17/10; G06T 17/20; B25J 9/1697; B25J 9/1687; B25J 13/089; B25J 19/023
See application file for complete search history.

(56) References Cited

U.S. PATENT DOCUMENTS

| | | | | |
|---|---|---|---|---|
| 2010/0085352 A1* | 4/2010 | Zhou | ................. | G06T 17/005 345/419 |
| 2021/0192841 A1* | 6/2021 | Hu | ................. | G01S 13/867 |
| 2022/0134559 A1* | 5/2022 | Li | ................. | B25J 9/1612 700/255 |

OTHER PUBLICATIONS

Zhou, Kun, Minmin Gong, Xin Huang, and Baining Guo. "Data-parallel octrees for surface reconstruction." IEEE transactions on visualization and computer graphics 17, No. 5 (2010): 669-681. (Year: 2010).*

* cited by examiner

*Primary Examiner* — King Y Poon
*Assistant Examiner* — Vincent Peren
(74) *Attorney, Agent, or Firm* — Banner & Witcoff Ltd.

(57) ABSTRACT

A system for generating a three-dimensional (3D) representation of a surface of an object. The system includes a point cloud processor and an object surface representation processor. The point cloud processor is to generate a structured point cloud of the object based on sensor data received from a sensor. The object surface representation processor is to: identify surface nodes in the structured point cloud; and link each surface node with any of its active neighbors to generate a surface net, wherein the linking comprises simultaneously establishing a forward-connectivity-link for a respective surface node to an active neighbor and a reverse-connectivity-link for the active neighbor to the respective surface node.

22 Claims, 13 Drawing Sheets

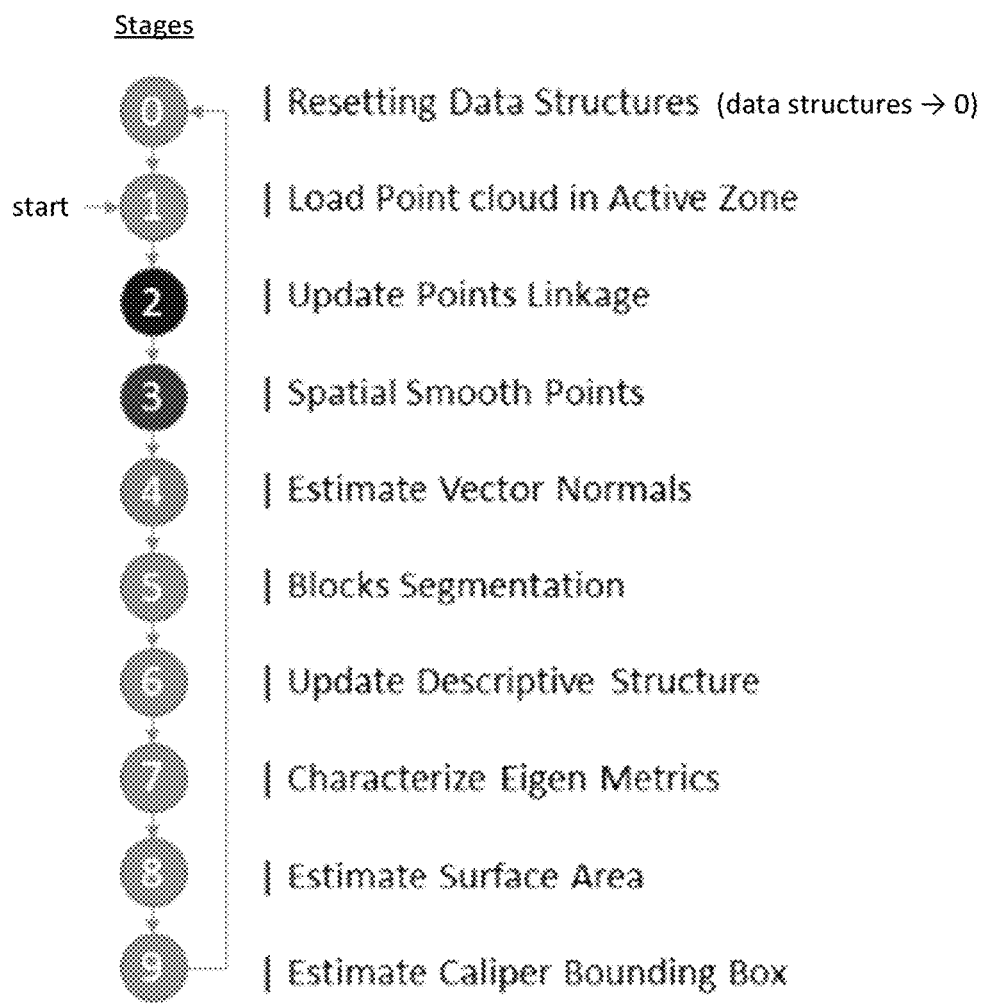

FIG 1

100
Overview of Method for Generation of an
Object Surface from a Structured Point Cloud Stages 0 — Resetting Data Structures (data structures → 0)

start → 1 — Load Point cloud in Active Zone

2 — Update Points Linkage

3 — Spatial Smooth Points

4 — Estimate Vector Normals

5 — Blocks Segmentation

6 — Update Descriptive Structure

7 — Characterize Eigen Metrics

8 — Estimate Surface Area

9 — Estimate Caliper Bounding Box

400
Stage 3 — Recursive Graph-Regularization resulting in Surface Smoothing

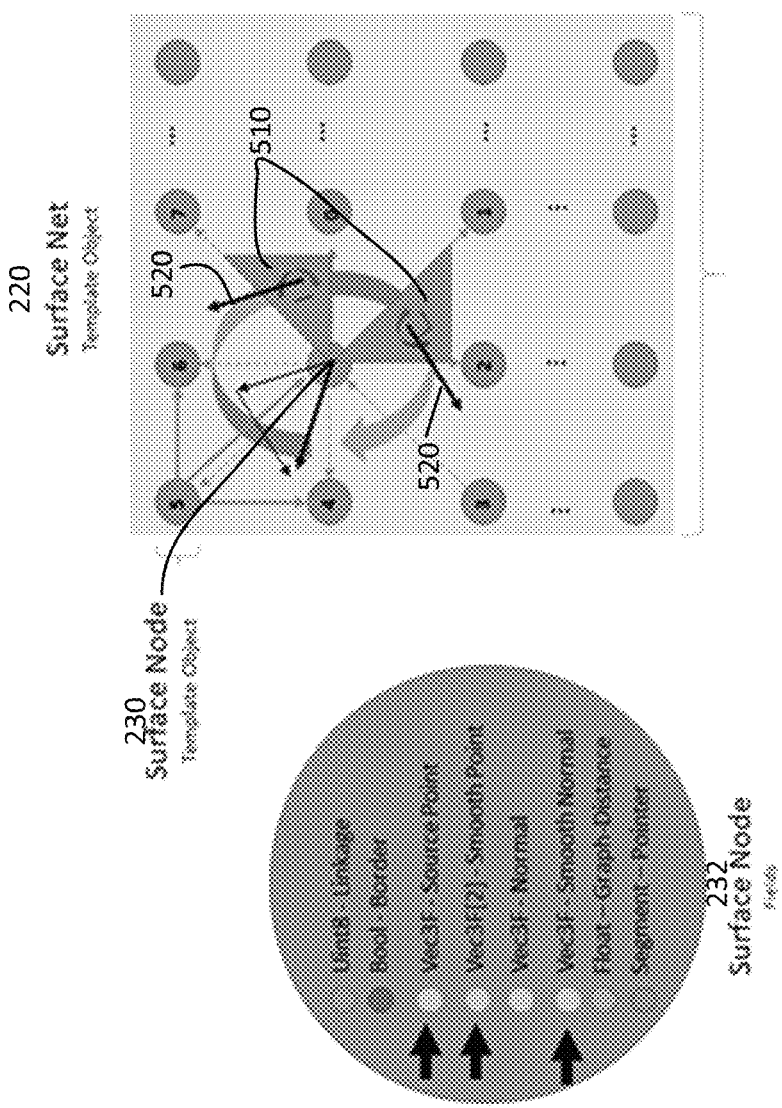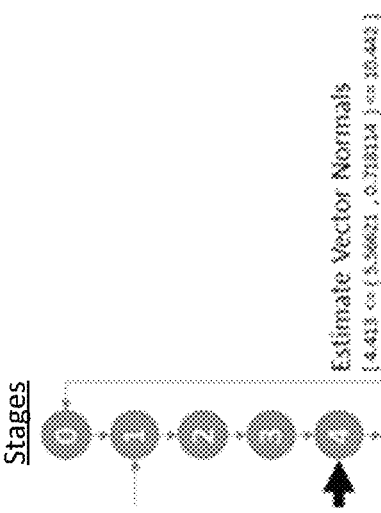
FIG 5

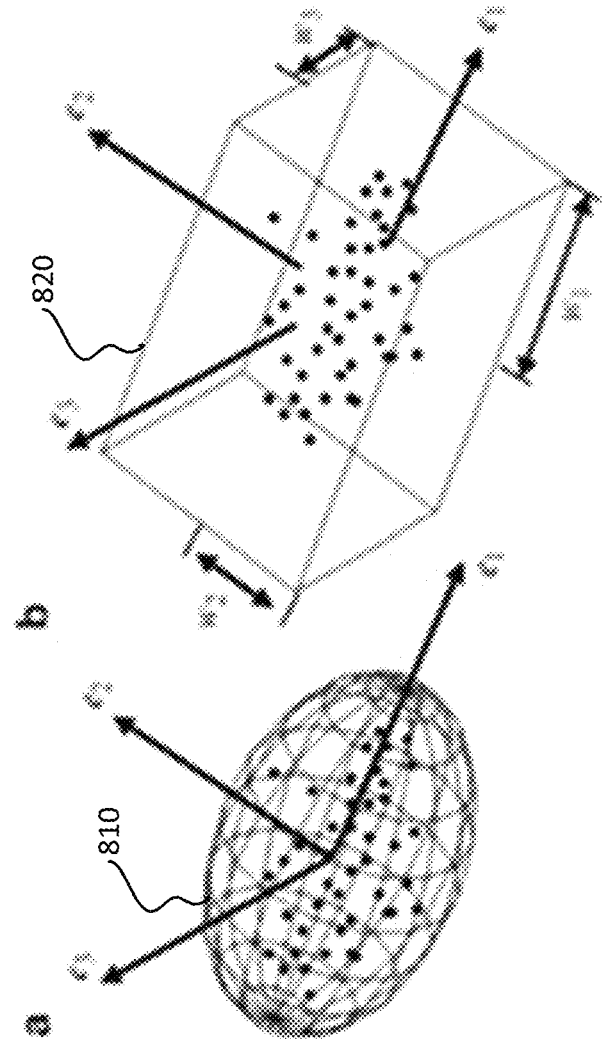
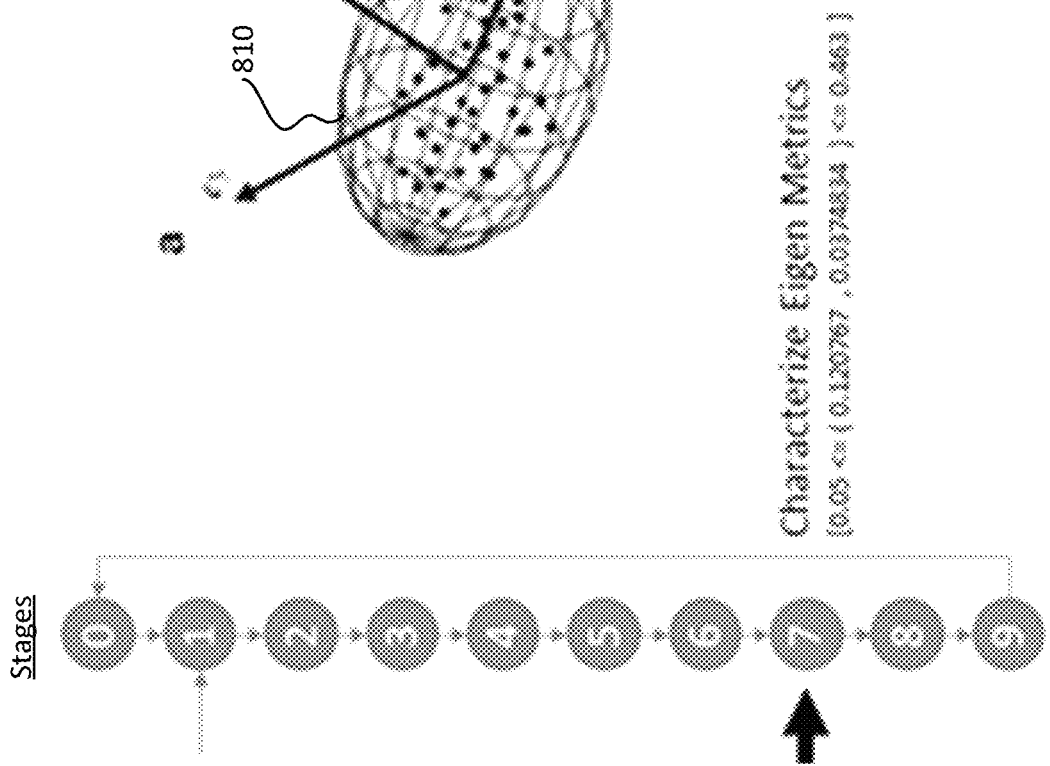
FIG 8

FIG 9
900
Phase 8 — Estimating Surface Areas
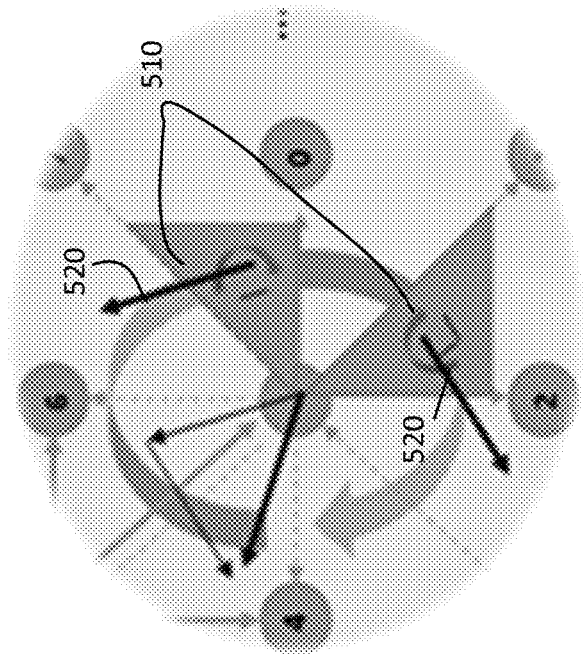
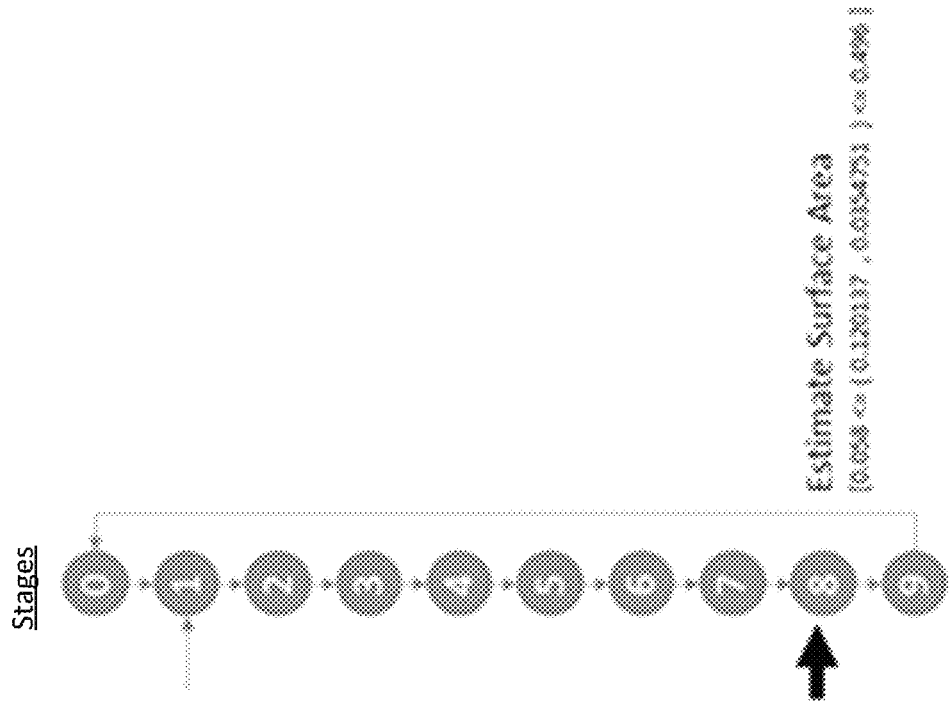

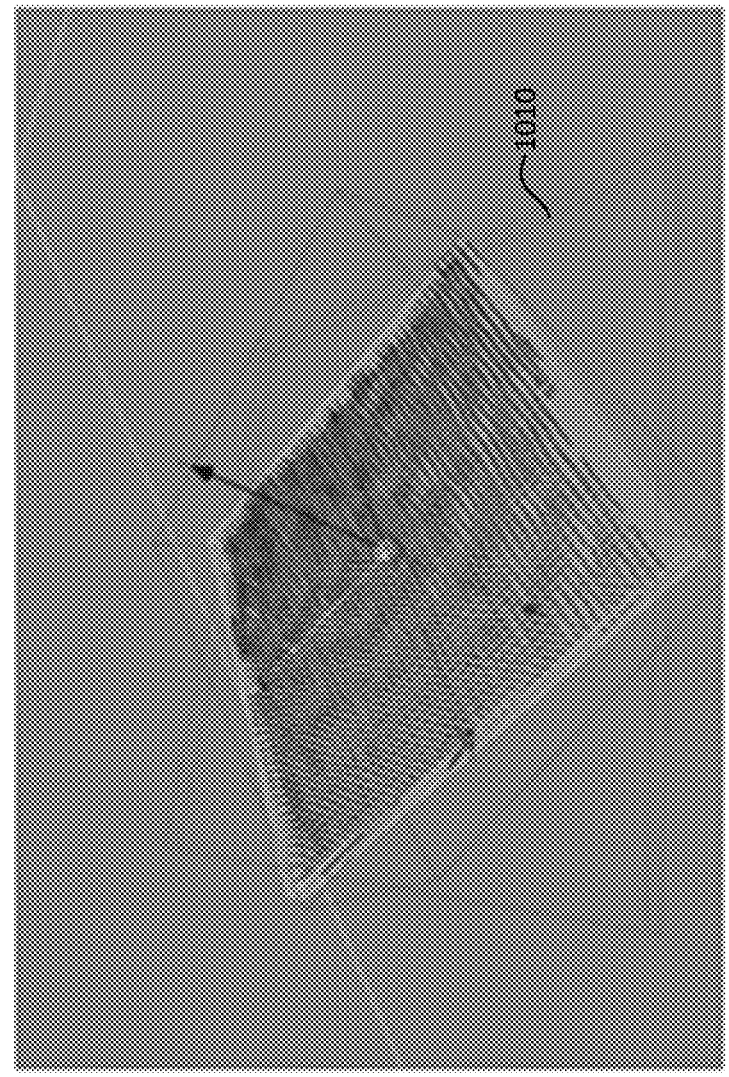
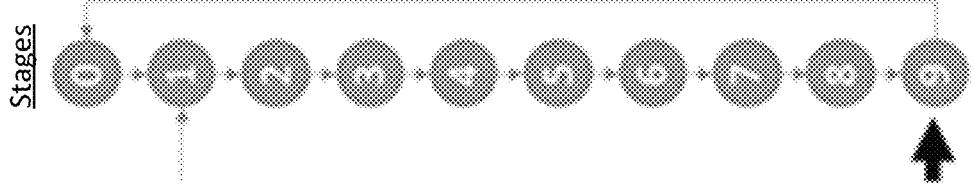
FIG 10
1000
Phase 9 — Estimating Caliper Shape

1300A
Typical Workspace of Industrial Robot Performing a Palletizing Task

1300B
Setup of Position and Orientation of 3D Sensor

GENERATION OF THREE-DIMENSIONAL REPRESENTATION OF OBJECT SURFACE FROM STRUCTURED POINT-CLOUD

TECHNICAL FIELD

The present disclosure relates to generation of three-dimensional representations of object surfaces from a structured point clouds using minimal memory and computational resources.

BACKGROUND

A work cell system obtains metrics of a three-dimensional (3D) workspace for a robot palletizing an object in an assembly, packing, or manufacturing plant. FIG. 13A illustrates a typical workspace 1300A with an industrial robot 1310 palletizing a box 1320. The work cell system captures and shares with the robot 1310 a 3D scene representation in order to plan and execute tasks. In particular, due to the vacuum nature of the robot's gripper in such applications, the robot 1310 requires not only a volumetric occupancy map of pallets and objects (e.g., boxes), but also a fine surface model to plan placement of the suction cups which grasp the objects. FIG. 13B illustrates a setup 1300B of position and orientation of a 3D sensor (e.g., camera, radar, lidar, ultrasound, etc.) at different angles, with black circles 1330 identifying image noise, outliers, and missing data (sensing gaps). Different properties of object material (e.g., shiny tape) or the nature of the sensor results in an area that cannot be sensed (sensing gaps).

BRIEF DESCRIPTION OF THE DRAWINGS

FIG. 1 illustrates a flowchart of an overview of a method for generation of an object surface from a structured point cloud.

FIG. 5 illustrates a diagram of stage 4, which estimates vector normals per point.

FIG. 8 illustrates a diagram of stage 7, which characterizes Eigen metrics of each segmented block.

FIG. 9 illustrates a diagram of stage 8, which estimates surface area per triangle and for the whole segmented block.

FIG. 10 illustrates a diagram of stage 9, which estimates a caliper bounding box.

DESCRIPTION OF THE ASPECTS

Figure 2:
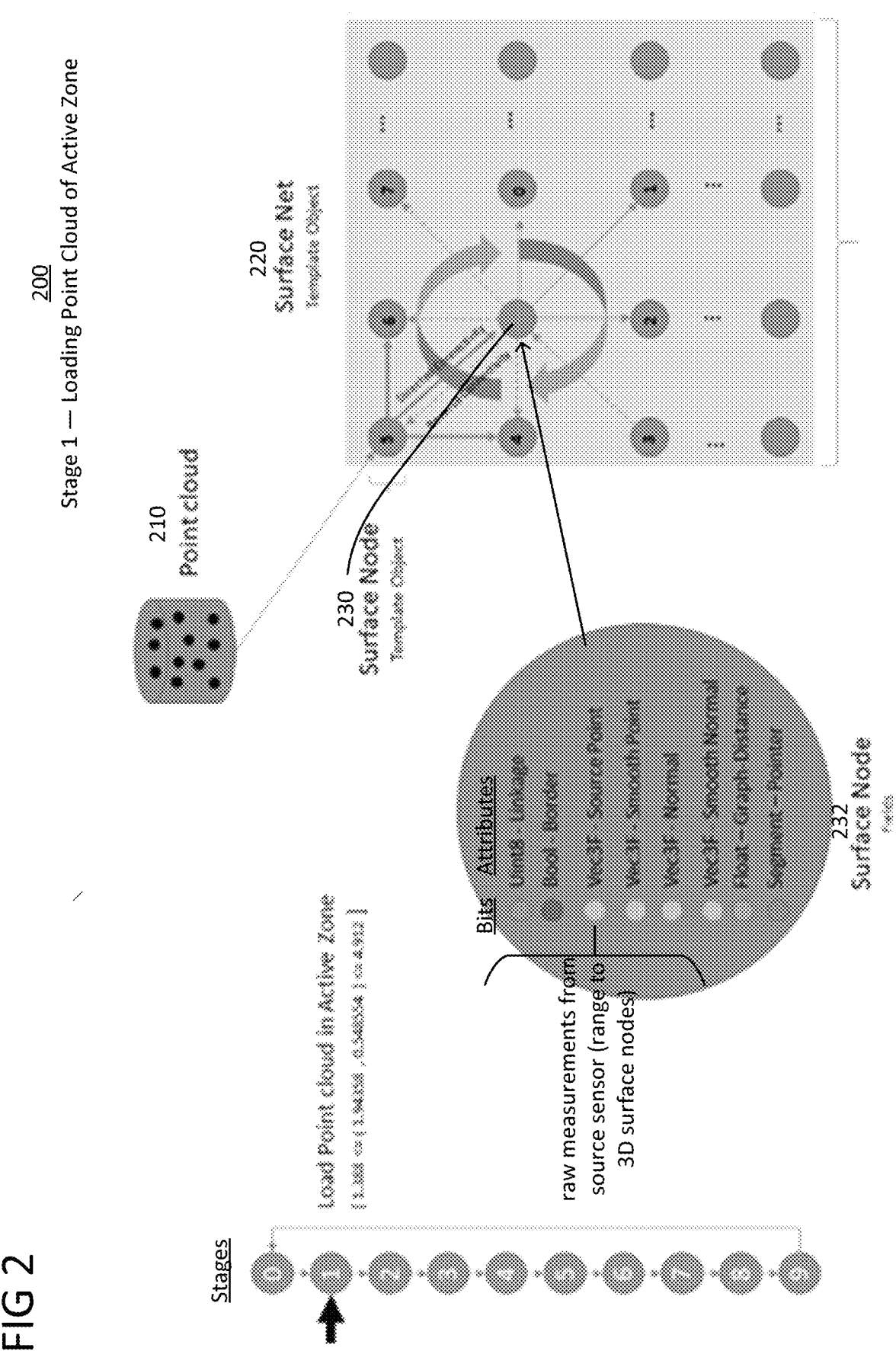
FIG. 2 illustrates a diagram of stage 1, which loads a structured point cloud of an active zone ("region of interest").

The present disclosure provides a three-dimensional (3D) solution for capturing and representing target objects as surface models using processors, such as central processing units (CPUs). The processors have a minimized memory footprint and low energy consumption, yet high frame-rate performance. The solution allows for low-cost, flexible use of processors which are either already available on a robot or handheld device or could be easily provided. There is also more efficient silicon use as compared with prior general processor unit (GPU) solutions. This 3D modeling has applications such as AR/VR/XR, gaming, robotic assembly, palletizing, polishing, sorting, navigation, inspection and the like.

FIG. 1 illustrates a flowchart 100 of an overview of a method for generation of an object surface from a structured point cloud. The method comprises nine cyclical stages described herein first as an overview followed by more detailed descriptions. The most significant of these nine stages are stages 2-4.

Stage 1 starts the method by loading 3D structured point cloud points defining an active sensing zone. The active sensing zone is a region or volume of a field delimited by a bounding box in which reconstruction takes place.

Stage 2 creates a bit-wise efficient graph representation of the 3D points using only eight bits per point, namely a bit-wise indexing list in which the index to location mapping allows a fast point-neighborhood management.

Stage 3 uses recursive graph regularization (as mean distance distribution to connected neighbors) to render an adaptive and efficient smoothing that preserves edges and signal acutance. Also, distance distribution of the graph edges are recursively reshaped, consequently homogenizing the underlying tessellation of the surface.

Stage 4, which is based on the bit-wise incidence graph and the regularized points position from the smoothing stage 3, estimates normals as a normalized sum of normals associated with a triangle's incidence per vertex. This stage improves cache efficiency while reducing the overall computational complexity.

Stage 5 extracts connected components via a parametric combination of linkage and aperture angles of the normals. These two parameters enable trimming of noisy connections in the graph and impose curvature limits for fast extraction of smooth and planar surfaces according to application settings. This stage is preferably sequential, whereas the other stages may be parallelized when using a threading scheme.

Once segments (blocks) are extracted, stage 6 characterizes the segments in terms of their descriptive statistics and bounding metrics. Segments that do not fulfill a minimum area, elongation ratios or length for a target application are disregarded, thereby avoiding unnecessary computation, time, and energy consumption.

Stage 7 characterizes pre-selected segments in terms of their rotation invariant axes, namely, their Eigen vectors and associated Eigen values. This stage includes not only remapping coordinates into an invariant and canonical coordinate system (with respect to sorted Eigen vectors by length), but also estimating the bounding box within this sensor invariant frame for a compact and representative shape description. "Canonical" in this context refers to the fact that the Eigen vector are renamed as I, J, and K on an orthonormal basis, increasingly depending on the magnitude of their associated real Eigen values. This ensures that the surface normal I is consistent regardless of its orientation with respect to the camera coordinate system.

Stage 8 uses surface triangle collection ("triangle soup") to compute an effective surface of the segment regardless of its topology and complexity. This scalar attribute is robust to objects and applications, easy to measure, and helps to easily set selection criteria to avoid further processing for shape (application-specific parameter) extraction.

Finally, stage 9 performs shape representation optimization for platonic shapes and geometric primitives. The method then cycles back to stage 0 to reset the values in the data structures back to 0.

More detailed descriptions of these stages follows with reference to FIGS. 2-10.

FIG. 2 illustrates a diagram 200 of stage 1, which loads a structured point cloud of an active zone.

In this stage, surface nodes 230 are identified based on a structured point cloud 210 of the object. There are two fundamental data structures—surface net 220 and surface nodes 230. The surface net 220 is an object in memory having a plurality of surface nodes 230, where each surface node 230 denotes a 3D point of the object surface being estimated and has stored in a memory/buffer 232 including attributes for use in later stages. The surface net 220 could be split into multiple memories/buffers, depending on the cache size of the processor, without affecting the formal mechanism described in the next stages. The surface nodes 230 are linked (connected) in the following stage 2 described below to create the surface net 220.

This stage 1 involves computing the 3D points using a depth image and the camera/sensor intrinsic parameters. For this stage, the use of a bounding box (not shown) defined as the active zone allows computation of only those surface nodes 230 (points) within this active region by looking at the depth range [Z0,Z1] of the axes aligned bounding box, and subsequently [Y0,Y1] and [X0,X1]. In a sequential and hierarchical manner, this reduces the computation only slightly for this stage, but with significant implications during subsequent stages. To optimize the cache effectiveness at this stage, this operation is performed by avoiding partially updating the linkage that is performed in the next stage 2. Also, empty surface nodes ("sensing gaps") imply no additional operation due to the reset data structures either at start or after stage 0 upon completing a full execution loop.

Figure 3:
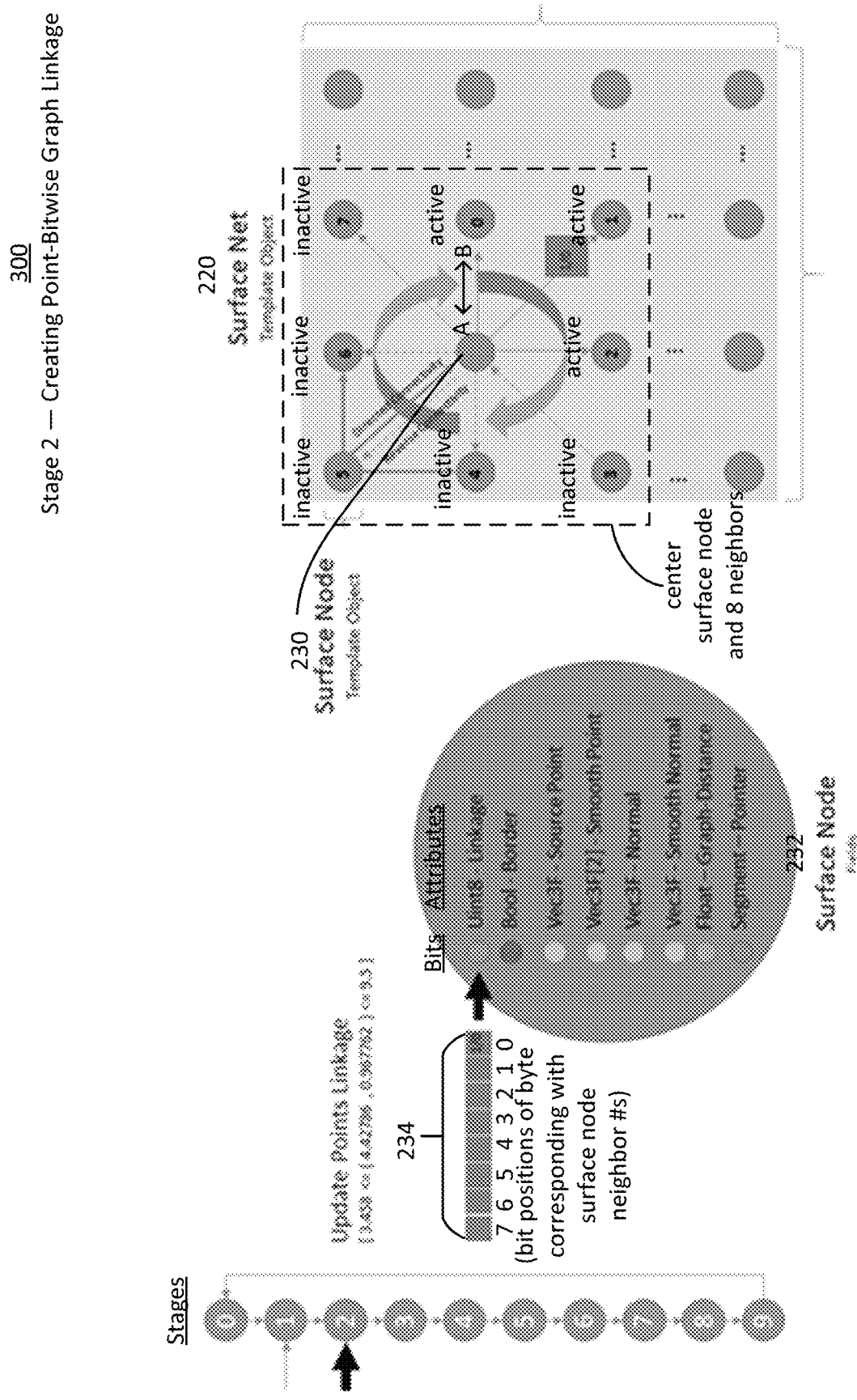
FIG. 3 illustrates a diagram of stage 2, which creates point-bit-wise graph linkage.

FIG. 3 illustrates a diagram 300 of stage 2, which creates point-bit-wise graph linkage.

In this stage the connectivity of the surface nodes 230 (points) is introduced and reflected in a bit-wise occupancy flag. This mechanism is used to detect which of the eight neighbors of a surface node 230 are actually valid (existing or sensed by sensor). As will become clear below, the surface continuum is reconstructed in an efficient manner so that all consecutive stages avoid repetitive searching/testing, and explicitly delineate triangles defining the surface.

Each surface node 230 is surrounded by eight neighbors—neighbor to the right being in position 0, the northeast corner position 7, southeast corner position 1, south position 2, southwest corner position 3, and so on. Each surface node 230 representing a 3D surface point of the object has an associated eight-bit byte 234 in memory 232 with bits (0 . . . 7) corresponding with respective direct neighbors (which are also surface nodes) of the surface node 230 relative to the surface node 230. The surface net 220 of the surface nodes 230 is created by linking each surface node 230 with its active neighbors by storing, for each active neighbor (0 . . . 7), an active (occupancy) bit in the surface node's associated byte 234 in a position (0 . . . 7) corresponding with the active neighbor's position in the surface net 220 relative to the surface node 230. An active/occupancy bit may be a "1" bit, by way of example, indicating that the neighbor actually exists and was sensed. For illustration purposes, the straight arrows between the surface nodes in the figure are solid if the neighbor is active and dotted if the neighbor is inactive. The thick, circular arrows indicate a selected direction in which the surface nodes are tested, in this example, clockwise. The direction remains consistent. Each of the surface nodes 230 is associated with each of the points from the depth image (range sensing) obtained from the sensor. For the next stages, for each of the surface nodes 230, instead of looking at the neighboring surface nodes 230, the method checks the linkage bit in the memory 232. This significantly reduces the memory operations and cache misses while also minimizing the number of verifications in subsequent stages.

The workload of creating this bit-wise occupancy flag is reduced by this linkage mapping (between pairs of points) employing dynamic programming in a reflexive manner. If the link from surface node A shown in the figure is established to surface node B when surface node 230 is the center node (i.e., A→B; "direct connectivity"), then the link from surface node B to surface node A is also established and does not need to be retested later when the neighboring surface numbered 0 becomes the center surface node (i.e., B→A; "reverse connectivity"). So after this one test, two bits are stored, one active bit for neighbor 0, and also an active bit in the active neighbor's associated byte in a position corresponding with the surface node's position relative to the active neighbor, which when the active neighbor becomes the center surface node, the position of the old center surface node is 4. This reduces the workload from eight tests to only four (or less) per surface node (3D point).

This linkage mapping further reduces computational cost by rejecting disconnected or poorly connected surface nodes 230 ("dangling edges") that lack greater than a predetermined (two or more) number of links to active neighbors.

Figure 4:
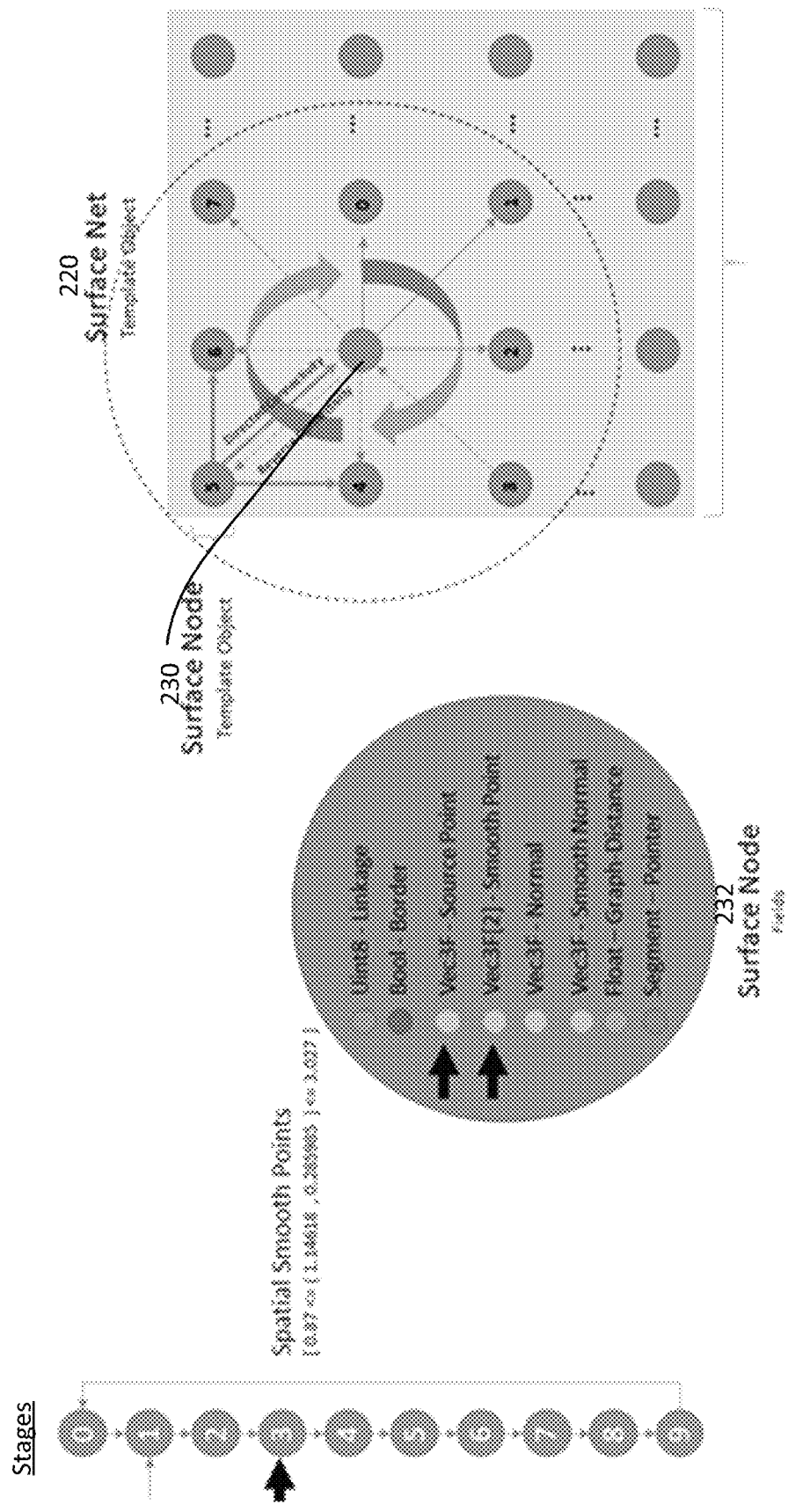
FIG. 4 illustrates a diagram of stage 3, which performs recursive graph-regularization, which results in edge-preserving surface smoothing.

FIG. 4 illustrates a diagram 400 of stage 3, which performs recursive graph-regularization resulting in surface smoothing.

In this stage the surface net 220 is smoothed using point-to-point Euclidian spatial distance regularization as a recursive graph-based mean distance averaging factoring in only those surface nodes 230 having greater than a predetermined number of linked neighbors to avoid the shrinkage of the segmented blocks.

Before normals are computed to determine relative local curvature of the surface at each sampled point (surface node), this stage removes noise with border/edge preserving. Existing methods include the multilateral convolution approach. Despite the effectiveness, the exiting methods are computationally inefficient particularly on CPU-only architectures. Moreover, these methods require non-intuitive application specific parameters (spatial and range kernel's bandwidths) which are sensor, object, and application setup specific rendering their performance costly, unstable, or even deteriorating of the signal if not set properly.

The method disclosed herein is instead based on graph distance distribution regularization by applying a filter which preserves the structural composition of the surface while regularizing the statistical distribution of linkage distribution. The surface is optimally smoothed by making the average distance to the connected neighbors of a surface node 230 as regular as possible without collapsing nor stretching the surface net 220 and border nodes.

More specifically, a recursive filter is designed such that for each surface node $X_c$ in three dimensions having six or more neighbors (L six linked neighbors) to avoid the shifting of the borders, the mean point of all neighbors is determined $X_n$. A weighted combination:

$$X_f^i = a^i * X_c^i + (1-a) * X_n^i \quad \text{(Equation 1)}$$

determines the new position of the surface node $X_f$ at the iteration index i. Because of its recursive nature, this process is performed in staged sequence for the image with a so-called front and back buffer. In practice, two or three loops return the best results and are executed in a maximum period of 3 ms for a full high definition depth image. The parameters of this filter are simple as the level of connectivity L is fixed. The range of a, $0.1 < a < 0.7171$, as a cycle gain is also determined and fixed based on experimental results producing a single external parameter which is the number of recursions $i_{max}$. This number is between two and five, with best computation/quality tradeoff at two to three depending on the CPU specifics and sensor noise behaviors.

FIG. 5 illustrates a diagram 500 of stage 4, which estimates vector normals.

This stage exploits the previous stages in terms of the smooth points and graph connectivity map. To obtain the normal vector per surface node 230, the incidence is analyzed to compute the normal vector of each of incident-derived triangle 510 describing the surface net 220. In other words, a normal 520 is estimated for each surface net triangle 510 having vertices corresponding with a respective one of the surface nodes 230 and two neighbors to which it is linked. The normal 520 for each surface net triangle 510 is estimated by estimating a normal at each surface node 230 forming one of the vertices of the surface net triangle 510, accumulating the estimated normals at the vertices of the surface net triangle 510 in the memory 232. This ensures that expensive computations (because of the normalizing square root) are done only once per triangle 510, so not more than a single time at a particular surface node 230, creating at most 8/3 (8 triangles/3 surface nodes) of these atomic operations per surface node 230. The computation of the normal 520 is affected by all three surface nodes 230. The computation is performed once for each of the three surface nodes 230 and stored to be used later. Finally, the accumulated estimated normal 520 is normalized to determine the normal at each surface node 230. These normalizations avoid unbalanced effects of the triangle 510's areas, which will would otherwise result on biased normals and consequently erroneous segmentation in the next stages. Also, outliers may be eliminated by eliminating any of the surface net triangles 510 having any two of its vertexes located greater than a predetermined distance from one another.

At this stage in the method, the surface net 220 has surface nodes 230 with smooth positions and normal, as well as bit-wise connectivity image per surface node 230.

Figure 6:
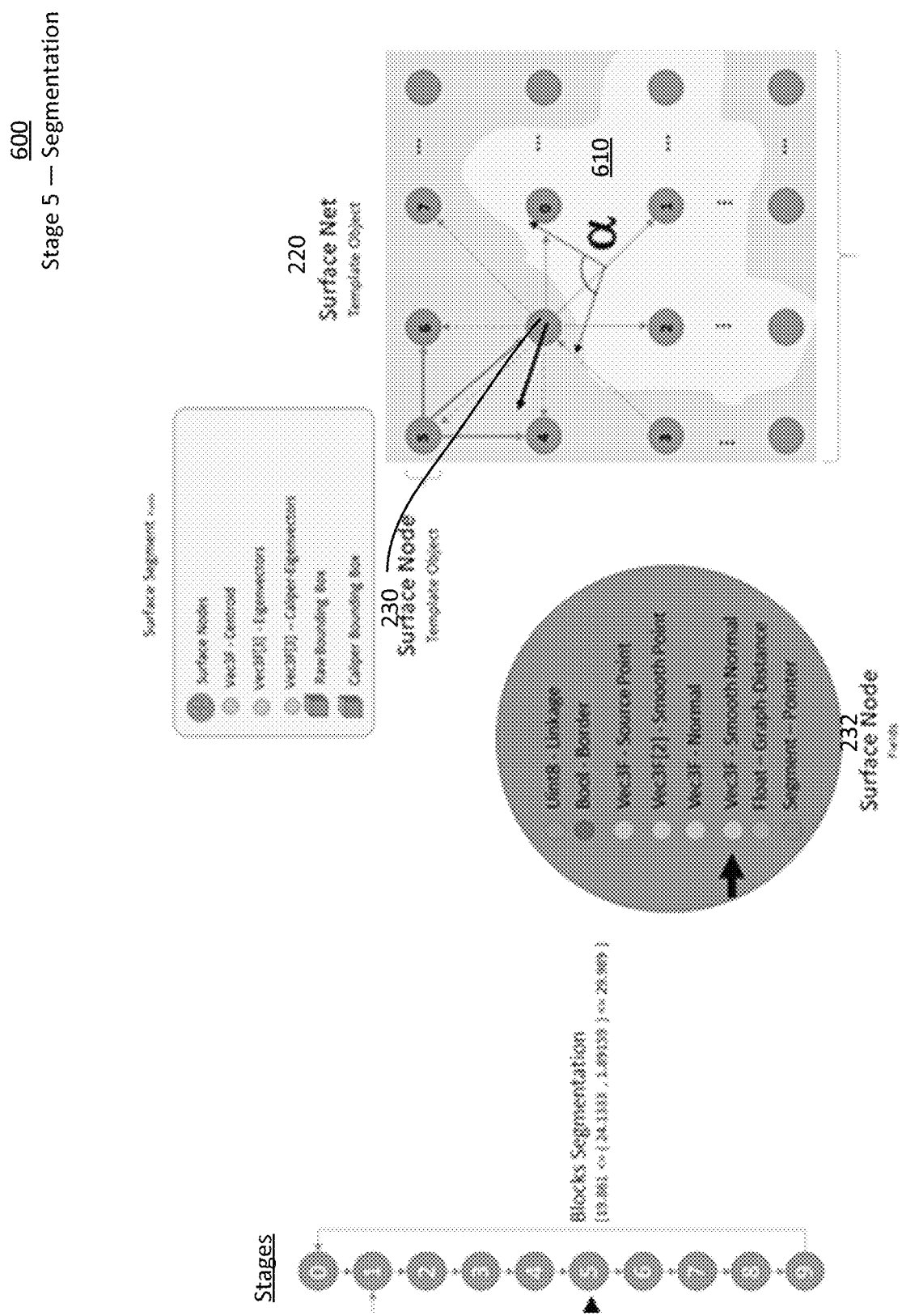
FIG. 6 illustrates a diagram of stage 5, which segments blocks as graph connected components on the structured point cloud.

FIG. 6 illustrates a diagram 600 of stage 5, which segments blocks.

Stage 5 is extracting, based on region growing segmentation across the surface net triangles 510, segments 610 of the surface net 220. The method executes queue-based region growing for minimal stack overhead, in which connectivity is already established in terms of gaps and distances. The criterion to obtain cohesive surfaces (i.e., not having abrupt normal discontinuities) is to verify the aperture between adjacent surface nodes 230. This is computed by the inner product of the normals 520 and compared to the cosine of a desired threshold angle, this way only linear matrix operations are used. This stage is performed via neighboring pairs of surface nodes 230, the result being a free-form smooth surface, which is the most general target for most applications. However, if the desired surfaces are semi-planar patches, this stage may be performed by verifying the aperture angle relative to the root of the region growing seeding point. The resulting set of segments 610 is independent of the seed starting points. Hence, the order of expansion is selected in the same scan-line, and then in the superior and inferior scan lines, to optimize the cache effects of the memory access pattern. This improves performance while keeping results invariant compared with any other expansion ordering.

Figure 7:
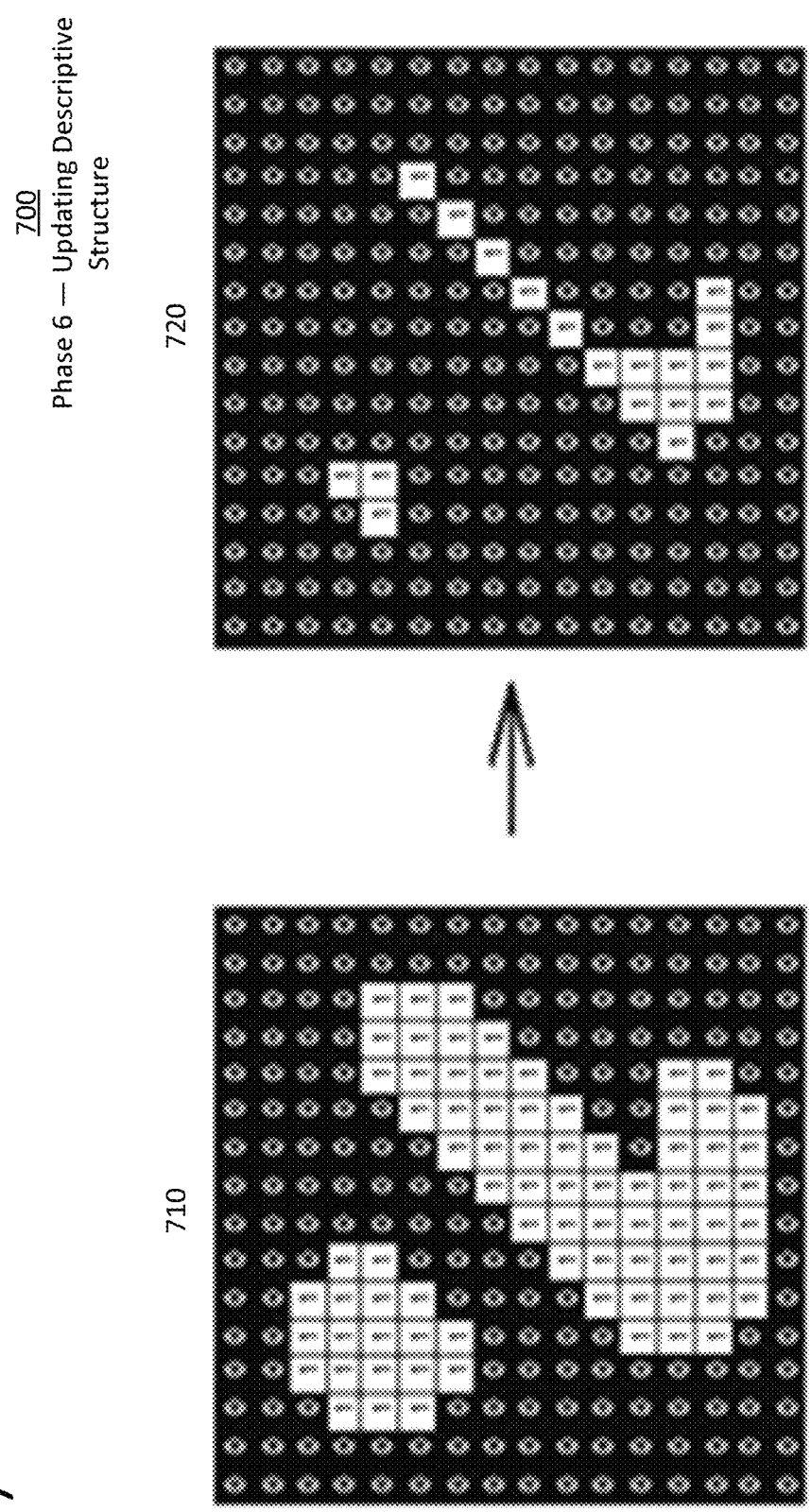
FIG. 7 illustrates a diagram of stage 6, which erodes the border elements of the segmented block to improve the block representatives and remove marginal noise.

FIG. 7 illustrates a diagram 700 of stage 6, which updates descriptive structures.

Stage 6 eliminates segments at a border by identifying segments 610 that do not meet an area or length criteria, as is known. FIG. 7 illustrates the surface net 710 before this stage 710, and the same surface net 720 after this stage. More specifically, this stage discards spurious segments by characterizing the surface nodes 230 within each segment 610. This process is applied to the inner elements avoiding considering the border surface nodes 230 because border surface nodes are usually the most position-instable and prone to noise. By computing the bounding box and number of core points per segment 610, it is possible to reject small outliers or large background regions (e.g., floor, ceiling, etc.) to focus resources on target segments 610.

FIG. 8 illustrates a diagram 800 of stage 7, which characterizes Eigen metrics.

Stage 7 characterizes a self-aligned axis bounding box metric for of each of the segments.

For the segments fulfilling all previous filtering constraints, it is possible to analyze their structure in terms their basic shapes. Their covariance matrices are decomposed to obtain the principal axes and spawn ranges in the canonical object coordinate system. The figure shows the bounding ellipsoid 810 and a resulting bounding box 820 with attributes.

When grasping and manipulating boxes or other semi-planar surfaces, size ratios of the spawning axis permits fast detection of planar ellipsoid, which has a relatively small span in one axis. Moreover, the points coordinates can be remapped to this object-centric coordinate system, thereby enabling further computations over the pseudo-2D surface coordinates (ignoring the dimension along the axis with the minimal associated eigenvalue) for a structure preserving dimensionality reduction when matching shape primitives.

FIG. 9 illustrates a diagram 900 of stage 8, which estimates surface areas.

Stage 8 estimates surface areas of the segments 610, and then eliminates segments 610 that do not meet a predetermined surface area criteria, such as based on estimated area, elongation, and/or radius.

In the process of selecting segments 610 for parametric fitting, efficiency can be improved by reducing the parameter estimation to only those segments 610 that are within certain ranges of size, area, elongation, ratio, etc. This may be performed in the pseudo 2D coordinates in a faster and more complex manner. As an example, there may be minimum and maximal box sizes to be manipulated in order to define the range of areas to be considered for possible grasping targets. Thus, the underlying 3D structure with incidence and the 2D simplified coordinates may be combined to define simple yet powerful intuitive filters, such as the area range as a discriminative selector. Regardless of the object's shape it is possible to obtain its area. This is because when the normals 520 are computed, the surface area is obtained by adding the triangles 510.

FIG. 10 illustrates a diagram 1000 of stage 9, which estimates a caliper bounding box.

Stage 9 estimates a minimum-perimeter bounding box of the surface of the object based on a caliper model on the segments in a known manner. This last stage 9 is focused on establishing the parametric description of the surface relevant to the application domain. This is a caliper estimation with a bounding box 1010 whose coordinates are not in global camera coordinates, but are in object coordinates or patch coordinates. The bounding box 1010 is characterized by having the minimum expanding volume that captures the points.

For illustration purposes but not meant to be limiting, the estimation of the minimal segment with rectangular shape robust to partial occlusions is performed via the caliper model. A numerical optimization within the embedding pseudo 2D space is used to establish what would be the caliper orientation and aperture which minimizes the area while keeping the orthogonality of the sides intact. This is a costly optimization in 3D. But within the delivered dimensionality reduction (from 3D to 2D) from stages 7 and 8, it is possible to optimize this in a minimal amount of time, thereby showcasing the power and advantage of the data structures and pipeline design disclosed herein.

The algorithm then returns to stage 0 to reset the data structures and repeat the stages.

The algorithm improves the user experience because a sensor (e.g., camera) shows in 3D a surface patch, the center, the orientation axis, the bounding box in both orientations' axes, and the bounding box in the camera axis. If the user can also view attribute details by viewing the surface net 220. The user not only can view the surface net 220, but can view the properties of each of the surface nodes 230. The user can see how the original raw data changed to the smoothed data, can view the normals, view the connectivity as a 3D graph, etc. Everything is accessible without requiring additional computations.

Various exemplary aspects described herein can be implemented, for example, using one or more well-known computer systems, such as computer system 1000 shown in FIG. 10. Computer system 1000 can be any well-known computer capable of performing the functions described herein, such as computers available from International Business Machines, Apple, Sun, HP, Dell, Sony, Toshiba, etc.

Figure 11:
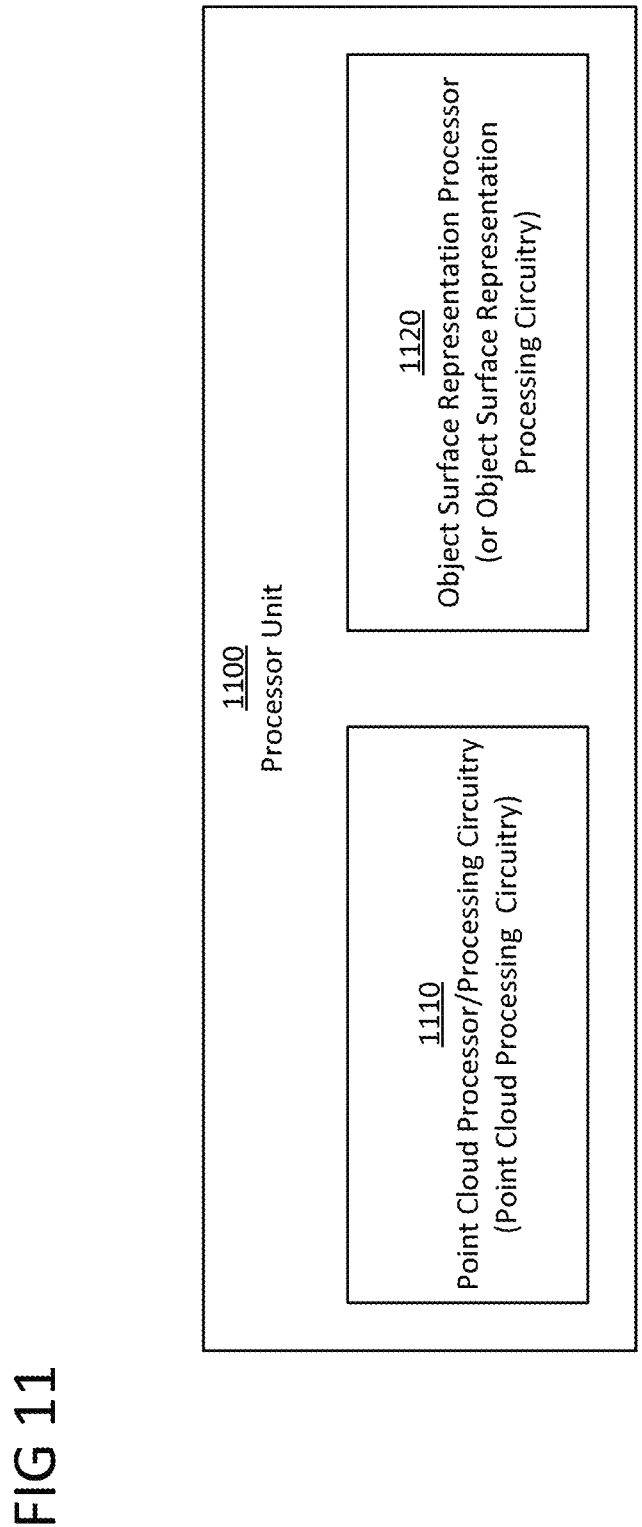
FIG. 11 illustrates a processor in accordance with aspects of the disclosure.

FIG. 11 illustrates a processor unit 1100 in accordance with aspects of the disclosure. The processor, or processing circuitry 1100, may comprise a point cloud processor 1110 and an object surface representation processor 1120. The point cloud processor 1110 is configured to generate a structured point cloud 210 of the object based on sensor data received from a sensor. The object surface representation processor 1120 is configured to identify surface nodes 230 in the structured point cloud 210, and link each surface node 239 with any of its active neighbors to generate a surface net 220. The linking comprises simultaneously establishing a forward-connectivity-link for a respective surface node 230 to an active neighbor and a reverse-connectivity-link for the active neighbor to the respective surface node 230, as described above.

With reference to FIG. 11, establishing the forward-connectivity-link may include storing an identifier in a memory portion assigned to the respective surface node, and in a position of the memory portion associated with the neighbor's position relative to the respective surface node.

Furthermore, the establishing the reverse-connectivity-link may include storing an identifier in a memory portion assigned to the active neighbor, and in a position of the memory portion associated with the respective surface node's position relative to the neighbor. In addition or in alternative to and in any combination with the optional features previously explained in this paragraph, the respective surface node's active neighbors may be immediately adjacent to the respective surface node. In addition or in alternative to and in any combination with the optional features previously explained in this paragraph, the object surface representation processor may further be configured to smooth the surface net in only surface nodes having greater than a predetermined number of linked active neighbors. Moreover, in addition or in alternative to and in any combination with the optional features previously explained in this paragraph, the object surface representation processor may further be configured to estimate a normal of each surface net triangle of the surface net, (vertices of the surface net triangles may be defined by the surface nodes) and/or to estimate the normal of each surface net triangle by normalizing accumulated estimated normals at vertices of the respective surface net triangle (a normal may be estimated at a particular surface node not more than a single time), and/or to estimate the normal of each surface net triangle by eliminating any of the surface net triangles having any two of its vertexes located greater than a predetermined distance from one another.

In addition or in alternative to and in any combination with the optional features previously explained in the previous paragraph, the object surface representation processor may further be configured to eliminate any surface nodes lacking greater than a predetermined number of links to active neighbors and/or to identify surface nodes based on only an active zone portion of the structured point cloud. Moreover, in addition or in alternative to and in any combination with the optional features previously explained in this and in the previous paragraph, the object surface representation processor may further be configured to extract, based on region growing segmentation across the surface net triangles, segments of the surface net. Furthermore, in addition or in alternative to and in any combination with the optional features previously explained in this and in the previous paragraph, the object surface representation processor may further be configured to eliminate segments at a border by identifying segments that do not meet an area criteria or a length criteria and/or to characterize a self-aligned axis bounding box metric for of each of the segments. Furthermore, in addition or in alternative to and in any combination with the optional features previously explained in this and in the previous paragraph, the object surface representation processor may further be configured to estimate surface areas of the segments and to eliminate segments that do not meet a predetermined surface area criteria, and/or the object surface representation processor may further be configured to: reset in memory surface node and surface net data with a single operation; and repeat the identifying and generating.

In various aspects of this disclosure, a system for generating a three-dimensional (3D) representation of a surface of an object is provided. The system may include a point cloud processing means for generating a structured point cloud of the object based on sensor data received from a sensor, and an object surface representation processing means for: identifying surface nodes in the structured point cloud; and linking each surface node with any of its active neighbors to generate a surface net. The linking may include simultaneously establishing a forward-connectivity-link for a respective surface node to an active neighbor and a reverse-connectivity-link for the active neighbor to the respective surface node. The establishing the forward-connectivity-link may include storing an identifier in a memory portion assigned to the respective surface node, and in a position of the memory portion associated with the neighbor's position relative to the respective surface node. The establishing the reverse-connectivity-link may include storing an identifier in a memory portion assigned to the active neighbor, and in a position of the memory portion associated with the respective surface node's position relative to the neighbor. In addition or in alternative to and in any combination with the optional features previously explained in this paragraph, any of the respective surface node's active neighbors may be immediately adjacent to the respective surface node. In addition or in alternative to and in any combination with the optional features previously explained in this paragraph, the object surface representation processing means may further include smoothing means for smoothing the surface net in only surface nodes having greater than a predetermined number of linked active neighbors. Moreover, in addition or in alternative to and in any combination with the optional features previously explained in this paragraph, the object surface representation processing means may include estimating means for estimating a normal of each surface net triangle of the surface net (vertices of the surface net triangles may be defined by the surface nodes) and/or for estimating the normal of each surface net triangle by normalizing accumulated estimated normals at vertices of the respective surface net triangle (a normal may be estimated at a particular surface node not more than a single time).

In various aspects, a robot is provided. The robot may include at least one sensor; a system for generating a three-dimensional (3D) representation of a surface of an object, the system comprising: a point cloud processor configured to generate a structured point cloud of the object based on sensor data received from the at least one sensor; and an object surface representation processor configured to: identify surface nodes in the structured point cloud; and link each surface node with any of its active neighbors to generate a surface net. The linking includes simultaneously establishing a forward-connectivity-link for a respective surface node to an active neighbor and a reverse-connectivity-link for the active neighbor to the respective surface node. The robot is configured to manipulate the object based on the generated surface net. The establishing the forward-connectivity-link may include storing an identifier in a memory portion assigned to the respective surface node, and in a position of the memory portion associated with the neighbor's position relative to the respective surface node. The establishing the reverse-connectivity-link may include storing an identifier in a memory portion assigned to the active neighbor, and in a position of the memory portion associated with the respective surface node's position relative to the neighbor. In addition or in alternative to and in any combination with the optional features previously explained in this paragraph, any of the respective surface node's active neighbors may be immediately adjacent to the respective surface node. In addition or in alternative to and in any combination with the optional features previously explained in this paragraph, the object surface representation processor may further be configured to smooth the surface net in only surface nodes having greater than a predetermined number of linked active neighbors. Moreover, in addition or in alternative to and in any combination with the optional features previously explained in this paragraph, the object surface representation processor may further be configured to estimate a normal of each surface net triangle of the surface net, wherein vertices of the surface net triangles are defined by the surface nodes.

Figure 12:
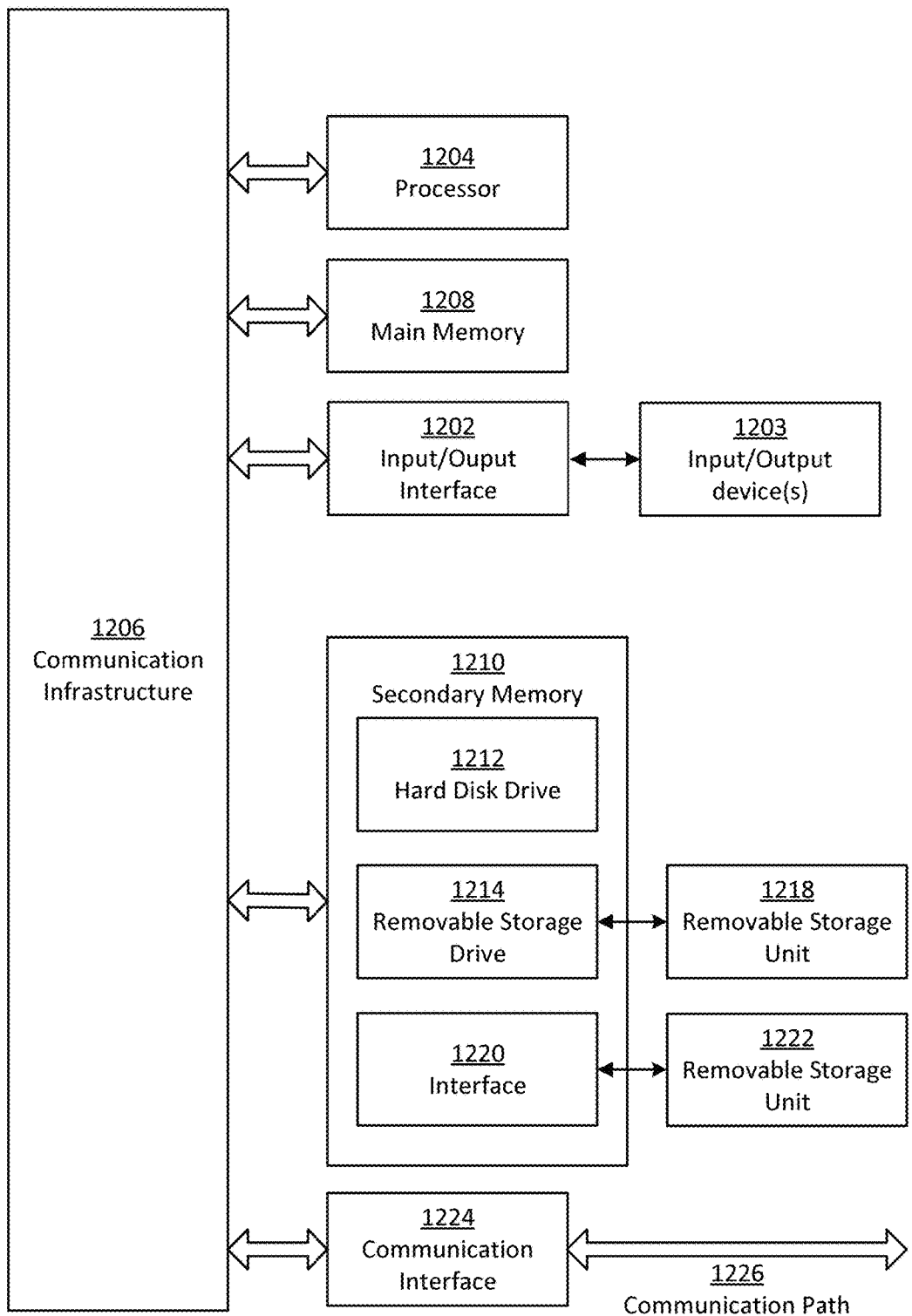
FIG. 12 illustrates a typical computer system.
Figure 13A:
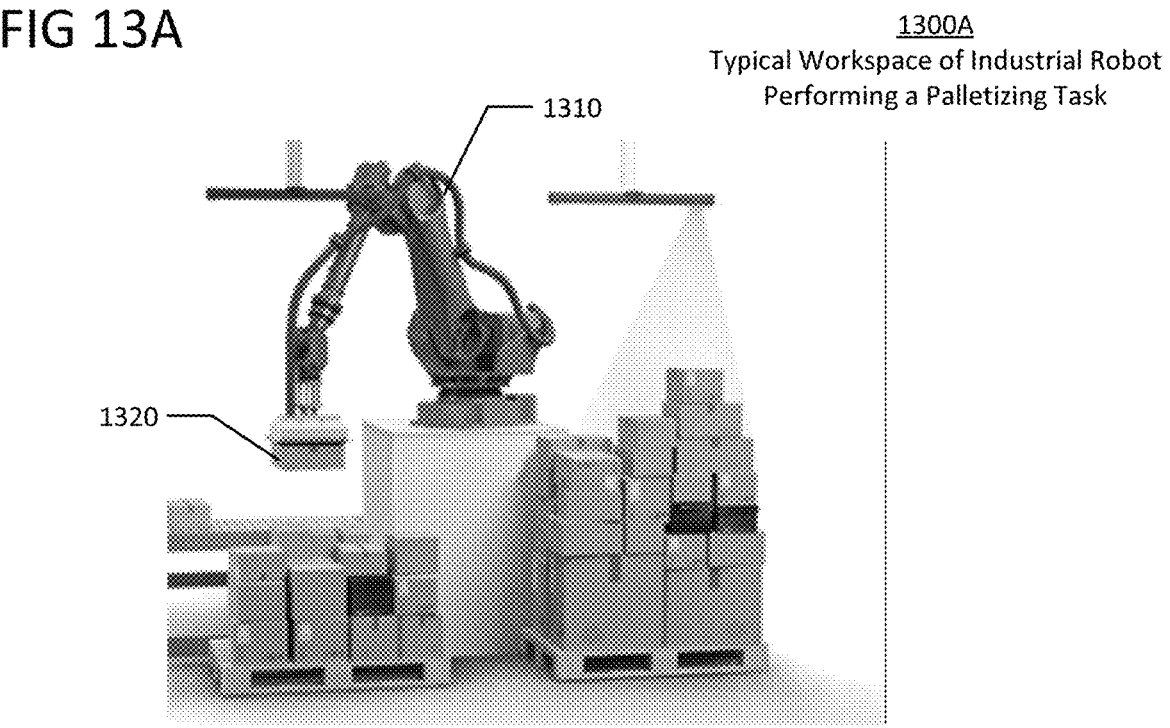
FIG. 13A illustrates a typical workspace with an industrial robot performing a palletizing task.
Figure 13B:
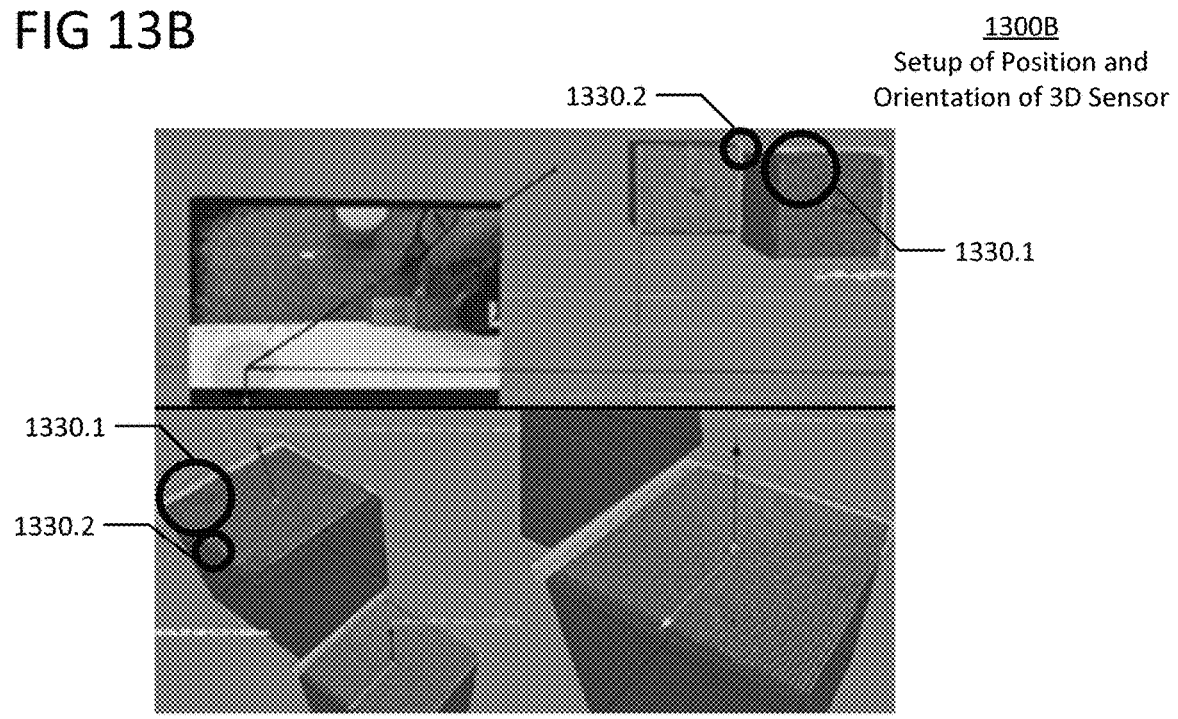
FIG. 13B illustrates a setup of position and orientation of a three-dimensional sensor.

FIG. 12 illustrates a typical computer system 1200.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an aspect, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos. The or more processors 1204 may comprise the processor unit 1100 which comprises a point cloud processor 1110 and an object surface representation processor 1120 as described above with respect to FIG. 11

Computer system 1200 also includes user input/output device(s) 1203, such as monitors, keyboards, pointing devices, etc., which communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary aspect, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an aspect, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 12. In particular, aspects may operate with software, hardware, and/or operating system implementations other than those described herein.

The generation of a 3D representation of a surface of an object as described herein is a cost-effective and flexible solution for 3D detecting, reconstruction, and measuring of objects in wide variety of physical interactions and applications. The generation may be performed by small-envelopment CPUs for tasks which thus far have been deployed using high-end GPUs, such as processor 1204, and application specific integrated circuits (ASICs). Lower power consumption reduces the overall cost of operation. Flexible use the same CPUs for multiple tasks by a time-sharing operating system provides a transparent approach rendering maximum silicone utilization. And the easy and intuitive means to set up a minimal set of parameters reduces the search space and pruning criteria for objects to be detected and tracked in terms of surface area, maximum curvature (as an aperture angle between normals) and/or dimensions. It is possible to deploy robots independent of the lighting conditions over large sensing ranges. The sensor agnostics expedite computation even when using high-definition, massive point clouds.

The solution disclosed herein exploits geometric cues of an underlying 2D structure of a depth image. Instead of working with a disjoint collection of 3D point extracting descriptors of their neighborhood local shapes via expensive covariance computations, this algorithm uses the 3D connective of the linked points from a depth image. For each depth pixel producing a 3D point, the algorithm has direct and immediate access to the adjacent surface points without K-nearest searching or creating indexation trees, such as octrees or K-D trees. This dramatically reduces computations by an order of magnitude with no memory cost or overhead. There is a significant improvement in data transfer rate between a memory and a CPU computing the surface smoothing and normal estimation processes. There is less need to access disjoint memory regions of non-linked deep-pixels, and as a consequence, cache-misses are reduced, translating into fast throughput.

The following examples pertain to further aspects.

An example (e.g., example 1) relates to a system for generating a three-dimensional (3D) representation of a surface of an object. The system includes a point cloud processor configured to generate a structured point cloud of the object based on sensor data received from a sensor; and an object surface representation processor configured to: identify surface nodes in the structured point cloud; and link each surface node with any of its active neighbors to generate a surface net, wherein the linking comprises simultaneously establishing a forward-connectivity-link for a respective surface node to an active neighbor and a reverse-connectivity-link for the active neighbor to the respective surface node.

Another example (e.g., example 2) relates to a previously-described example (e.g., example 1), wherein the establishing the forward-connectivity-link comprises storing an identifier in a memory portion assigned to the respective surface node, and in a position of the memory portion associated with the neighbor's position relative to the respective surface node, and wherein the establishing the reverse-connectivity-link comprises storing an identifier in a memory portion assigned to the active neighbor, and in a position of the memory portion associated with the respective surface node's position relative to the neighbor.

Another example (e.g., example 3) relates to a previously-described example (e.g., one or more examples 1-2), wherein any of the respective surface node's active neighbors are immediately adjacent to the respective surface node.

Another example (e.g., example 4) relates to a previously-described example (e.g., one or more examples 1-3), wherein the object surface representation processor is further configured to smooth the surface net in only surface nodes having greater than a predetermined number of linked active neighbors.

Another example (e.g., example 5) relates to a previously-described example (e.g., one or more examples 1-4), wherein the object surface representation processor is further configured to estimate a normal of each surface net triangle of the surface net, wherein vertices of the surface net triangles are defined by the surface nodes.

Another example (e.g., example 6) relates to a previously-described example (e.g., one or more examples 1-5), wherein the object surface representation processor is configured to estimate the normal of each surface net triangle by normalizing accumulated estimated normals at vertices of the respective surface net triangle, wherein a normal is estimated at a particular surface node not more than a single time.

Another example (e.g., example 7) relates to a previously-described example (e.g., one or more examples 1-6), wherein the object surface representation processor is configured to estimate the normal of each surface net triangle by eliminating any of the surface net triangles having any two of its vertexes located greater than a predetermined distance from one another.

Another example (e.g., example 8) relates to a previously-described example (e.g., one or more examples 1-7), wherein the object surface representation processor is further configured to eliminate any surface nodes lacking greater than a predetermined number of links to active neighbors.

Another example (e.g., example 9) relates to a previously-described example (e.g., one or more examples 1-8), wherein the object surface representation processor is further configured to identify surface nodes based on only an active zone portion of the structured point cloud.

Another example (e.g., example 10) relates to a previously-described example (e.g., one or more examples 1-9), wherein the object surface representation processor is further configured to extract, based on region growing segmentation across the surface net triangles, segments of the surface net.

Another example (e.g., example 11) relates to a previously-described example (e.g., one or more examples 1-10), wherein the object surface representation processor is further configured to eliminate segments at a border by identifying segments that do not meet an area criteria or a length criteria.

Another example (e.g., example 12) relates to a previously-described example (e.g., one or more examples 1-11), wherein the object surface representation processor is further configured to characterize a self-aligned axis bounding box metric for of each of the segments.

Another example (e.g., example 13) relates to a previously-described example (e.g., one or more examples 1-12), wherein the object surface representation processor is further configured to: estimate surface areas of the segments; and eliminate segments that do not meet a predetermined surface area criteria.

Another example (e.g., example 14) relates to a previously-described example (e.g., one or more examples 1-13), wherein the object surface representation processor is further configured to: reset in memory surface node and surface net data with a single operation; and repeat the identifying and generating.

An example (e.g., example 15) relates to a system for generating a three-dimensional (3D) representation of a surface of an object. The system includes a point cloud processing means for generating a structured point cloud of the object based on sensor data received from a sensor; and an object surface representation processing means for: identifying surface nodes in the structured point cloud; and linking each surface node with any of its active neighbors to generate a surface net, wherein the linking comprises simultaneously establishing a forward-connectivity-link for a respective surface node to an active neighbor and a reverse-connectivity-link for the active neighbor to the respective surface node.

Another example (e.g., example 16) relates to a previously-described example (e.g., example 15), wherein the establishing the forward-connectivity-link comprises storing an identifier in a memory portion assigned to the respective surface node, and in a position of the memory portion associated with the neighbor's position relative to the respective surface node, and wherein the establishing the reverse-connectivity-link comprises storing an identifier in a memory portion assigned to the active neighbor, and in a position of the memory portion associated with the respective surface node's position relative to the neighbor.

Another example (e.g., example 17) relates to a previously-described example (e.g., one or more examples 15-16), wherein any of the respective surface node's active neighbors are immediately adjacent to the respective surface node.

Another example (e.g., example 18) relates to a previously-described example (e.g., one or more examples 15-17), wherein the object surface representation processing means comprises smoothing means for smoothing the surface net in only surface nodes having greater than a predetermined number of linked active neighbors.

Another example (e.g., example 19) relates to a previously-described example (e.g., one or more examples 15-18), wherein the object surface representation processing means comprises estimating means for estimating a normal of each surface net triangle of the surface net, wherein vertices of the surface net triangles are defined by the surface nodes.

Another example (e.g., example 20) relates to a previously-described example (e.g., one or more examples 15-19), wherein the object surface representation processing means comprises estimating means for estimating the normal of each surface net triangle by normalizing accumulated estimated normals at vertices of the respective surface net triangle, wherein a normal is estimated at a particular surface node not more than a single time.

An example (e.g., example 21) relates to a robot including at least one sensor; a system for generating a three-dimensional (3D) representation of a surface of an object, the system comprising: a point cloud processor configured to generate a structured point cloud of the object based on sensor data received from the at least one sensor; and an object surface representation processor configured to: identify surface nodes in the structured point cloud; and link each surface node with any of its active neighbors to generate a surface net, wherein the linking comprises simultaneously establishing a forward-connectivity-link for a respective surface node to an active neighbor and a reverse-connectivity-link for the active neighbor to the respective surface node, wherein the robot is configured to manipulate the object based on the generated surface net.

Another example (e.g., example 22) relates to a previously-described example (e.g., example 21), wherein the establishing the forward-connectivity-link comprises storing an identifier in a memory portion assigned to the respective surface node, and in a position of the memory portion associated with the neighbor's position relative to the respective surface node, and wherein the establishing the reverse-connectivity-link comprises storing an identifier in a memory portion assigned to the active neighbor, and in a position of the memory portion associated with the respective surface node's position relative to the neighbor.

Another example (e.g., example 23) relates to a previously-described example (e.g., one or more examples 21-22), wherein any of the respective surface node's active neighbors are immediately adjacent to the respective surface node.

Another example (e.g., example 24) relates to a previously-described example (e.g., one or more examples 21-23), wherein the object surface representation processor is further configured to smooth the surface net in only surface nodes having greater than a predetermined number of linked active neighbors.

Another example (e.g., example 25) relates to a previously-described example (e.g., one or more examples 21-24), wherein the object surface representation processor is further configured to estimate a normal of each surface net triangle of the surface net, wherein vertices of the surface net triangles are defined by the surface nodes.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A system for generating a three-dimensional (3D) representation of a surface of an object, the system comprising:
a point cloud processing means for generating a structured point cloud of the object based on sensor data received from a sensor; and
an object surface representation processing means for:
identifying surface nodes in the structured point cloud; and
linking each surface node with any of its active neighbors to generate a surface net, wherein the linking comprises simultaneously establishing a forward-connectivity-link for a respective surface node to an active neighbor and a reverse-connectivity-link for the active neighbor to the respective surface node,
wherein the establishing the forward-connectivity-link comprises storing an identifier in a memory portion assigned to the respective surface node, and in a position of the memory portion associated with the neighbor's position relative to the respective surface node, and
wherein the establishing the reverse-connectivity-link comprises storing an identifier in a memory portion assigned to the active neighbor, and in a position of the memory portion associated with the respective surface node's position relative to the neighbor.

2. The system of claim 1, wherein any of the respective surface node's active neighbors are immediately adjacent to the respective surface node.

3. The system of claim 1, wherein the object surface representation processing means comprises estimating means for estimating the normal of each surface net triangle by normalizing accumulated estimated normals at vertices of the respective surface net triangle, wherein a normal is estimated at a particular surface node not more than a single time.

4. The system of claim 1, wherein the object surface representation processing means comprises smoothing means for smoothing the surface net in only surface nodes having greater than a predetermined number of linked active neighbors.

5. The system of claim 4, wherein the object surface representation processing means comprises estimating means for estimating a normal of each surface net triangle of the surface net, wherein vertices of the surface net triangles are defined by the surface nodes.

6. A system for generating a three-dimensional (3D) representation of a surface of an object, the system comprising:
a point cloud processor configured to generate a structured point cloud of the object based on sensor data received from a sensor; and
an object surface representation processor configured to:
identify surface nodes in the structured point cloud; and
link each surface node with any of its active neighbors to generate a surface net, wherein the linking comprises simultaneously establishing a forward-connectivity-link for a respective surface node to an active neighbor and a reverse-connectivity-link for the active neighbor to the respective surface node,
wherein the establishing the forward-connectivity-link comprises storing an identifier in a memory portion assigned to the respective surface node, and in a position of the memory portion associated with the neighbor's position relative to the respective surface node, and
wherein the establishing the reverse-connectivity-link comprises storing an identifier in a memory portion assigned to the active neighbor, and in a position of the memory portion associated with the respective surface node's position relative to the neighbor.

7. The system of claim 6, wherein any of the respective surface node's active neighbors are immediately adjacent to the respective surface node.

8. The system of claim 6, wherein the object surface representation processor is further configured to eliminate any surface nodes lacking greater than a predetermined number of links to active neighbors.

9. The system of claim 6, wherein the object surface representation processor is further configured to identify surface nodes based on only an active zone portion of the structured point cloud.

10. The system of claim 6, wherein the object surface representation processor is further configured to:
reset in memory surface node and surface net data with a single operation; and
repeat the identifying and generating.

11. The system of claim 6, wherein the object surface representation processor is further configured to smooth the surface net in only surface nodes having greater than a predetermined number of linked active neighbors.

12. The system of claim 11, wherein the object surface representation processor is further configured to estimate a normal of each surface net triangle of the surface net, wherein vertices of the surface net triangles are defined by the surface nodes.

13. The system of claim 12, wherein the object surface representation processor is configured to estimate the normal of each surface net triangle by normalizing accumulated estimated normals at vertices of the respective surface net triangle, wherein a normal is estimated at a particular surface node not more than a single time.

14. The system of claim 12, wherein the object surface representation processor is configured to estimate the normal of each surface net triangle by eliminating any of the surface net triangles having any two of its vertexes located greater than a predetermined distance from one another.

15. The system of claim 12, wherein the object surface representation processor is further configured to extract, based on region growing segmentation across the surface net triangles, segments of the surface net.

16. The system of claim 15, wherein the object surface representation processor is further configured to eliminate segments at a border by identifying segments that do not meet an area criteria or a length criteria.

17. The system of claim 15, wherein the object surface representation processor is further configured to characterize a self-aligned axis bounding box metric for of each of the segments.

18. The system of claim 17, wherein the object surface representation processor is further configured to:
estimate surface areas of the segments; and
eliminate segments that do not meet a predetermined surface area criteria.

19. A robot, comprising:
at least one sensor;
a system for generating a three-dimensional (3D) representation of a surface of an object, the system comprising:

a point cloud processor configured to generate a structured point cloud of the object based on sensor data received from the at least one sensor; and an object surface representation processor configured to:

identify surface nodes in the structured point cloud; and link each surface node with any of its active neighbors to generate a surface net, wherein the linking comprises simultaneously establishing a forward-connectivity-link for a respective surface node to an active neighbor and a reverse-connectivity-link for the active neighbor to the respective surface node, wherein the establishing the forward-connectivity-link comprises storing an identifier in a memory portion assigned to the respective surface node, and in a position of the memory portion associated with the neighbor's position relative to the respective surface node, and wherein the establishing the reverse-connectivity-link comprises storing an identifier in a memory portion assigned to the active neighbor, and in a position of the memory portion associated with the respective surface node's position relative to the neighbor, wherein the robot is configured to manipulate the object based on the generated surface net.

20. The robot of claim 19, wherein any of the respective surface node's active neighbors are immediately adjacent to the respective surface node.

21. The robot of claim 19, wherein the object surface representation processor is further configured to smooth the surface net in only surface nodes having greater than a predetermined number of linked active neighbors.

22. The robot of claim 21, wherein the object surface representation processor is further configured to estimate a normal of each surface net triangle of the surface net, wherein vertices of the surface net triangles are defined by the surface nodes.

* * * * *